(No Model.)
D. HEDRICK.
BRAKE BLOCK HOLDER.
No. 322,099. Patented July 14, 1885.
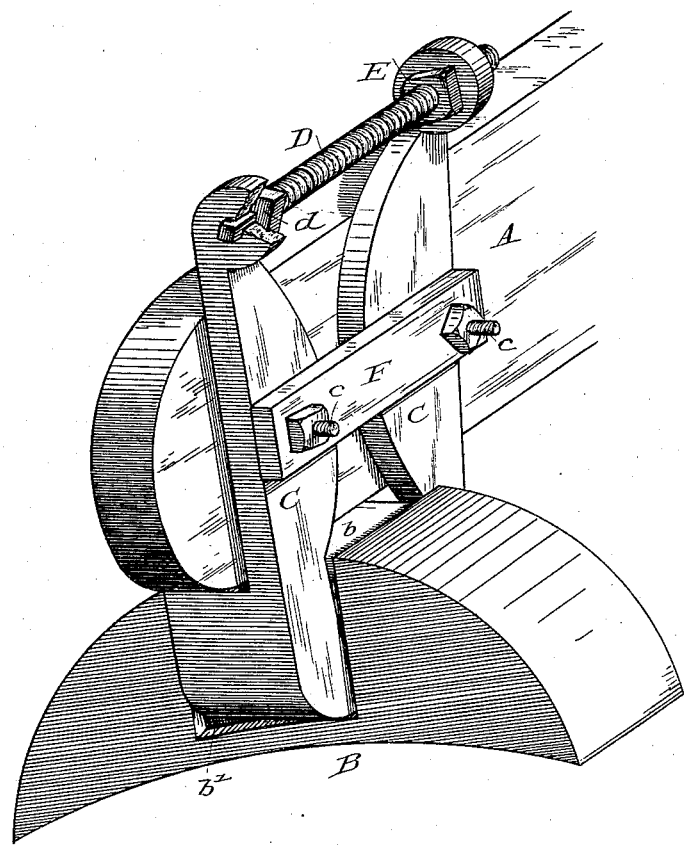
Witnesses,
Geo. H. Strong.
J. H. House.
Inventor
D. Hedrick
By
Dewey & Co.
Attorneys

UNITED STATES PATENT OFFICE.

DUSKIN HEDRICK, OF GREENVILLE, CALIFORNIA.

BRAKE-BLOCK HOLDER.

SPECIFICATION forming part of Letters Patent No. 322,099, dated July 14, 1885.

Application filed May 4, 1885. (No model.)

*To all whom it may concern:*

Be it known that I, DUSKIN HEDRICK, of Greenville, county of Plumas, and State of California, have invented an Improvement in Brake-Block Holders; and I hereby declare the following to be a full, clear, and exact description thereof.

My invention relates to that class of brake-block holders in which clamping-jaws are employed to secure the block to the bar; and my invention consists of peculiarly-pivoted jaws on the brake-bar adapted to clamp the block, the sides of which are properly shouldered to receive said jaws, a screw mounted in and connecting the rear ends of the jaws, and a nut on the screw adapted to force the rear ends of the jaws in opposite directions, whereby their forward ends are forced together to clamp the block, all of which I shall hereinafter fully describe.

The object of my invention is to provide a simple and effective means for clamping the brake-block, and for relieving it, when necessary, to permit its easy removal for the substitution of a fresh block.

Referring to the accompanying drawing, the figure is a perspective view of my brake-block, a portion of the rear end of one of the jaws being broken away to show the collar $d$.

A is the brake bar or beam. B is the brake-block. C are the jaws; and D is the screw, and E is the nut on the screw. The bar or beam A is of the usual style of such bars, applicable to heavy or light wagons alike. The block B has the usual curved face, adapting it to impinge against the tire of the wheel. Its back is notched out, forming a transverse shoulder, $b$, and its sides are likewise cut out, forming a depressed portion or socket, $b'$, which should preferably be beveled inwardly from rear to front to permit the jaws to obtain a better grip. The jaws C are pivoted to the bar by means of bolts $c$. Their forward or gripping ends project beyond the bar, and their rear ends extend behind it. A connecting link or brace, F, extends between the jaws for general strengthening purposes. The screw D is provided near one end with a fixed collar, $d$, and has upon its body the nut E.

The various parts herein described are put together and operate as follows: The screw D is fitted in sockets or holes in the rear ends of the jaws. The collar $d$ bears against the inner side of one jaw, while the nut E is adapted to bear against the inner surface of the other jaw. By causing the nut to move toward the collar, the rear ends of the jaws may be made to approach, thus turning the jaws on their pivot-centers, so that their forward ends separate far enough to permit the insertion of block B between them. The jaws grip the block in its sockets $b'$, and a steady rest is afforded by reason of the shoulder $b$ and the upper walls of the sockets resting on top of the jaws. The nut E is now screwed against the adjacent jaw, whereby the rear ends separate, thus causing their forward ends to approach and grip the block tightly.

I am aware that screw-power has been employed to set up jaws against a brake-block, but not by the arrangement of parts I have shown. I do not, therefore, claim such, broadly, but only the particular construction and arrangement I have described, whereby I obtain a simple and effective clamp.

Having thus described my invention, what I claim as new, and desire to secure by Letters Patent, is—

1. The jaws pivoted to the brake-bar and adapted to receive the block between their forward ends, in combination with a power mechanism on their rear ends behind their pivot-centers, and adapted to force said rear ends in opposite directions, to cause their forward ends to grip the block, substantially as herein described.

2. In combination with a brake-bar and a brake-block, oppositely-working jaws pivoted on the bar, and adapted to receive the block between their forward ends, a screw mounted between and in their rear ends behind their pivot-centers, and a nut on the screw adapted to force said rear ends in opposite directions, to cause their forward ends to grip the block, substantially as herein described.

3. The brake-bar A and the brake-block B, in combination with the jaws C, pivoted on the bar and adapted to receive the block between their forward ends, the screw D, extending between the rear ends of the jaws, the fixed collar $d$ on the screw bearing against the inner surface of one jaw, and the nut E on said screw bearing against the inner surface of the other jaw, all arranged and adapted to operate substantially as herein described.

4. The brake-bar A and brake-block B, having a shoulder, b, on its back, and depressions or sockets b' in its sides, in combination with the jaws C, pivoted by bolts c to the bar, and adapted to fit their forward ends in the side sockets, b', of the block and under the shoulder b, the screw D, mounted within and between the rear ends of the jaws, and a nut on the screw adapted to move said rear ends oppositely, to force their forward ends to grip the block, substantially as herein described.

5. The combination of the bar A, block B, jaws C, pivoted by bolts c to the bar, and receiving the block between their forward ends, the link F between the jaws, the screw D between the rear ends of the jaws, the fixed collar d, and nut E on the screw, all arranged and adapted to operate substantially as herein described.

In witness whereof I have hereunto set my hand.

DUSKIN HEDRICK.

Witnesses:
T. F. EMMONS,
H. WILLIAMS.